US006275191B1

(12) United States Patent
Lesea et al.

(10) Patent No.: US 6,275,191 B1
(45) Date of Patent: Aug. 14, 2001

(54) INCREASED PROPAGATION SPEED ACROSS INTEGRATED CIRCUITS

(75) Inventors: Austin H. Lesea; Robert O. Conn, both of Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/634,698

(22) Filed: Aug. 8, 2000

Related U.S. Application Data

(62) Division of application No. 09/302,587, filed on Apr. 30, 1999.

(51) Int. Cl.[7] ................................ H01Q 1/38; G06F 7/38

(52) U.S. Cl. ....................................... 343/700 MS; 326/39

(58) Field of Search ......................... 34/700 MS; 326/39, 326/40, 41; 327/295

(56) References Cited

U.S. PATENT DOCUMENTS 5,254,886 * 10/1993 El-Ayat et al. ...................... 307/465
5,391,942 * 2/1995 El-Ayat et al. ........................ 326/39
5,969,559 * 10/1999 Schwartz ............................. 327/295

* cited by examiner

*Primary Examiner*—Don Wong
*Assistant Examiner*—Hoang Nguyen
(74) *Attorney, Agent, or Firm*—T. Lester Wallace

(57) ABSTRACT

The maximum propagation speed of an electrical signal travelling on a conductor in an integrated circuit is limited by the dielectric constant of the dielectric material surrounding the conductor. Rather than transmitting an electrical signal through a conductor that is surrounded with a dielectric material having a dielectric constant of two or more, the signal is propagated as an electromagnetic wave through air at a much higher speed across the surface of the integrated circuit. In one embodiment, a radio frequency (RF) signal is passed into an integrated circuit package via a transmission line. The transmission line supplies the RF signal to a waveguide-like structure disposed above the integrated circuit inside the package. The RF signal propagates as an electromagnetic wave through air in the waveguide structure across the upper surface of the integrated circuit. Antenna/receiver circuit pairs are disposed at various locations across the surface of the integrated circuit where the signal is to be received and used. Other methods and embodiments are disclosed.

23 Claims, 6 Drawing Sheets

INCREASED PROPAGATION SPEED ACROSS INTEGRATED CIRCUITS

RELATED APPLICATION

This application is a divisional of U.S. patent application Ser. No. 09/302,587 entitled "Increased Propagation Speed Across Integrated Circuits" filed Apr. 30, 1999.

FIELD OF THE INVENTION

This invention relates generally to methods and circuit configurations for increasing the propagation speed of a signal across an integrated circuit and/or for eliminating clock distribution networks from integrated circuits.

BACKGROUND INFORMATION

FIG. 1 (Prior Art) is a simplified top-down diagram illustrative of a field programmable gate array (FPGA) integrated circuit 1. Integrated circuit 1 includes a ring of bond pads 2, an inner core of configurable logic blocks 3, and a fork-shaped clock distribution network 4. A clock signal present on a clock input pad 5 passes through a clock buffer 6, is distributed vertically through a vertical clock bus 7, passes through clock buffers 8–12, and then propagates horizontally from left to right through corresponding horizontally extending clock buses 13–17. In the bottom most clock bus 17, the clock signal propagates left to right from clock buffer 12, past point 18, and down the clock bus to point 19.

FIG. 2 (Prior Art) is a simplified cross-sectional diagram of a portion of integrated circuit 1 showing a section of clock bus 17. Numerous layers of Metallization 20 and dielectric material 21 are disposed over the substrate 22 of the integrated circuit 1. In the illustrated example, the metal of the clock bus 17 is insulated from other layers of metal above it and below it by dielectric material 21.

FIG. 3 (Prior Art) illustrates a series of RC trees 23 that is often used to model the propagation of a clock signal down such a clock bus. Points 18 and 19 in FIG. 3 correspond to points 18 and 19 in FIG. 1, respectively. The larger the resistance R, the longer it will take for the clock signal to propagate from point 18 to point 19. Similarly, the larger the capacitance C, the longer it will take for the clock signal to propagate from point 18 to point 19. Resistance R represents the distributed resistance of the clock bus being modeled. The capacitance C represents the distributed capacitance of the clock bus. The larger the dielectric constant K of the dielectric material separating the clock bus 17 from the other conductors of FIG. 2, the larger the distributed capacitance C.

In the example of FIG. 1, the propagation delay of the clock signal across the integrated circuit chip means that an edge of the clock signal will arrive at point 19 after it has arrived at point 18. This difference in time when the clock edge arrives is called "clock skew". In a digital integrated circuit, it is often desired to keep the magnitude of the clock skew within a certain percentage of the period of the clock signal. For example, it may be desired to keep the clock skew within ten percent of the clock period. A given clock edge is to arrive at all logic blocks within the same time period (ten percent of the clock period). A clock signal having a frequency of 500 megahertz has a period of two nanoseconds. Accordingly, in this example, if the clock signal is to arrive at all logic blocks within ten percent of the clock period, then the clock signal must be able to propagate across the integrated circuit in about two tenths of a nanosecond. Integrated circuits today can be 2.5 centimeters on a side and the locations where clock signals are required can easily be two centimeters apart. For the clock signal to travel two centimeters in two tenths of a nanosecond requires a propagation speed of about $10^8$ meters per second. Achieving such a high propagation speed across an integrated circuit is difficult.

Moreover, future advances in semiconductor processing technology are likely to lead to a desire to increase clock speeds into the gigahertz range. Such an increase in clock speed would further reduce the amount of time available for a clock signal to travel across an integrated circuit. Moreover, future integrated circuits may be even larger than integrated circuits of today. Such increases in size will likely result in the clock signal having to travel even greater distances. It is therefore foreseen that clock speeds of future integrated circuits may be limited by the propagation speed of clock signals on the integrated circuits.

SUMMARY

The propagation velocity of an electromagnetic wave through a transmission medium is limited by the inductance and capacitance per unit length of the medium. In the $$V = \frac{1}{\sqrt{K}} Vac \qquad \text{(equ. 1)}$$

context of a clock signal traveling down a clock bus surrounded by an interlayer dielectric in a conventional integrated circuit, this means that the maximum propagation speed V of the clock signal is limited by the dielectric constant K of the dielectric to be a fraction of the speed of light in a free space Vac in accordance with equation 1 below. The larger the dielectric constant K, the slower the clock signal will travel. Silicon dioxide, a common dielectric used for interlayer dielectric in conventional integrated circuits, has a dielectric constant of roughly four. The maximum velocity for a clock signal traveling laterally across an integrated circuit down a clock bus that is surrounded by silicon dioxide is therefore approximately $1.5\times10^8$ meters per second (about one half the speed of light in free space).

It is recognized, however, that the velocity of an electromagnetic wave travelling through air is quite close to the speed of light in free space. The dielectric constant of dry air is almost exactly one. The present invention in one embodiment takes advantage of this fact.

In accordance with one embodiment of the present invention, a clock signal is transmitted as an electromagnetic wave that propagates in air in a direction substantially parallel to the upper surface of an integrated circuit. Due to the wave propagating in air, its velocity is very close to that of the speed of light in free space ($3\times10^8$ meters per second). At a location on the integrated circuit where the clock signal is to be used, an antenna and receiving circuit are provided. The antenna is connected to the input of the receiving circuit. The electromagnetic wave propagates through the air across the upper surface of the integrated circuit at a high velocity. When it reaches the antenna it induces a corresponding signal in the antenna. This signal is then amplified by the receiving circuit to output the clock signal. One or more pairs of such antennas and receiving circuits are disposed across the surface of the integrated circuit, one at each location where the clock signal is needed. Skew between the various clock signals output by the various receiving circuits is reduced due to the increased propagation velocity of the electromagnetic wave over the upper surface of the integrated circuit.

In accordance with some embodiments, a field programmable gate array has no clock distribution network of clock buses. Rather than conducting a clock signal around the integrated circuit on a distribution network of metal conductors, the clock signal is transmitted as an electromagnetic wave to antennas that are distributed across the integrated circuit at locations where the clock signal is to be used. Elimination of the clock distribution network frees up routing resources for other uses. In some embodiments, some of the sequential logic of a field programmable gate array is coupled to a clock distribution network whereas other operating sequential logic of the field programmable gate array is not connected to the clock distribution network but rather is clocked by a clock signal that is received on a local antenna.

Other structures and methods are disclosed in the detailed description below. This summary does not purport to define the invention. The invention is defined by the claims.

DETAILED DESCRIPTION

Figure 1:
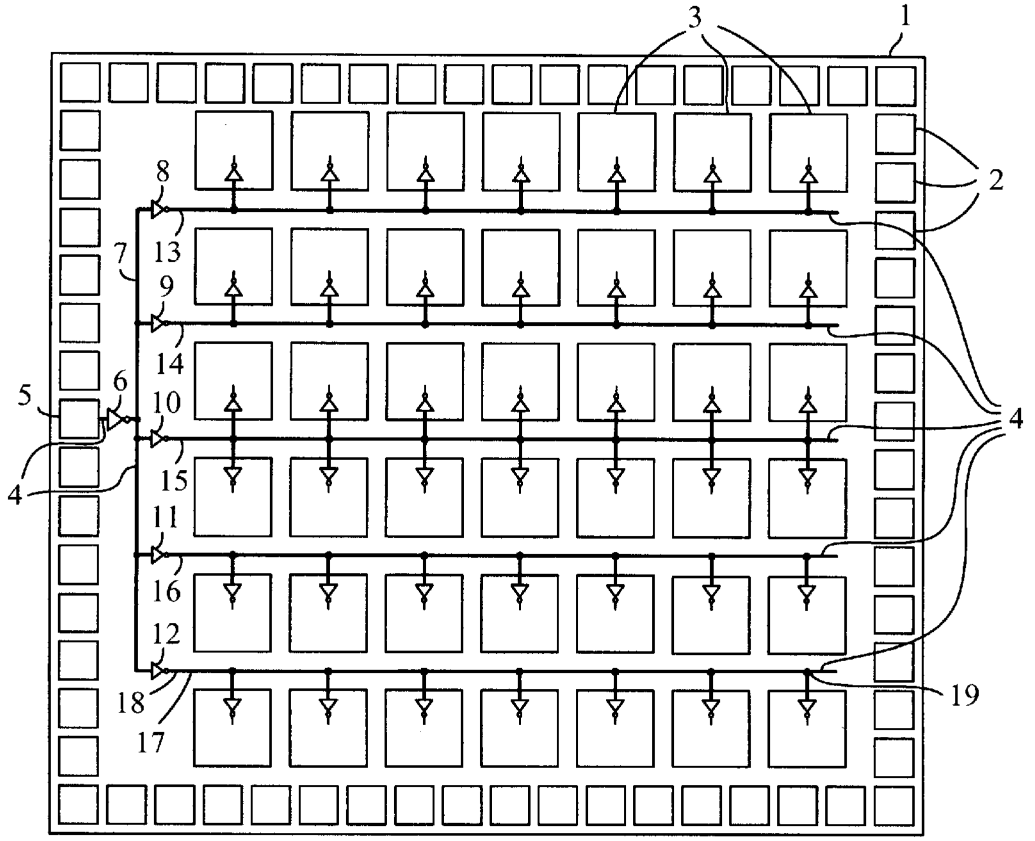
FIG. 1 (PRIOR ART)
FIG. 1 (Prior Art) is a simplified top-down diagram showing the clock distribution network of a field programmable gate array (FPGA) integrated circuit.
Figure 2:
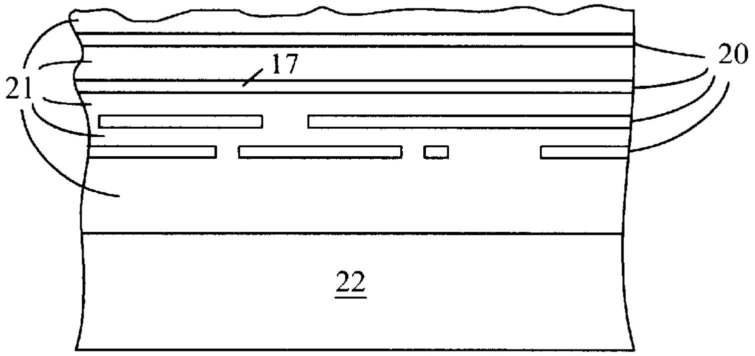
FIG. 2 (PRIOR ART)
FIG. 2 (Prior Art) is a simplified cross-sectional diagram showing a clock bus of the integrated circuit of FIG. 1.
Figure 3:
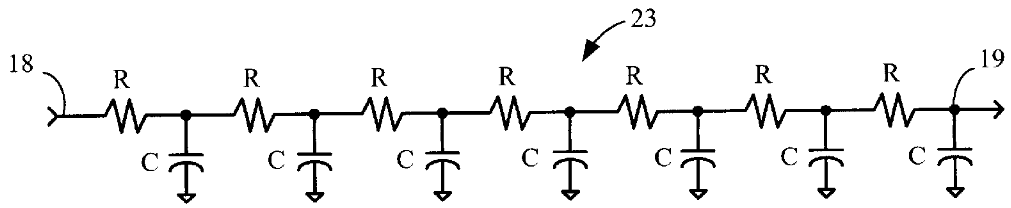
FIG. 3 (PRIOR ART)
FIG. 3 is circuit used for modeling the propagation of a signal through a clock bus of an integrated circuit.
Figure 4:
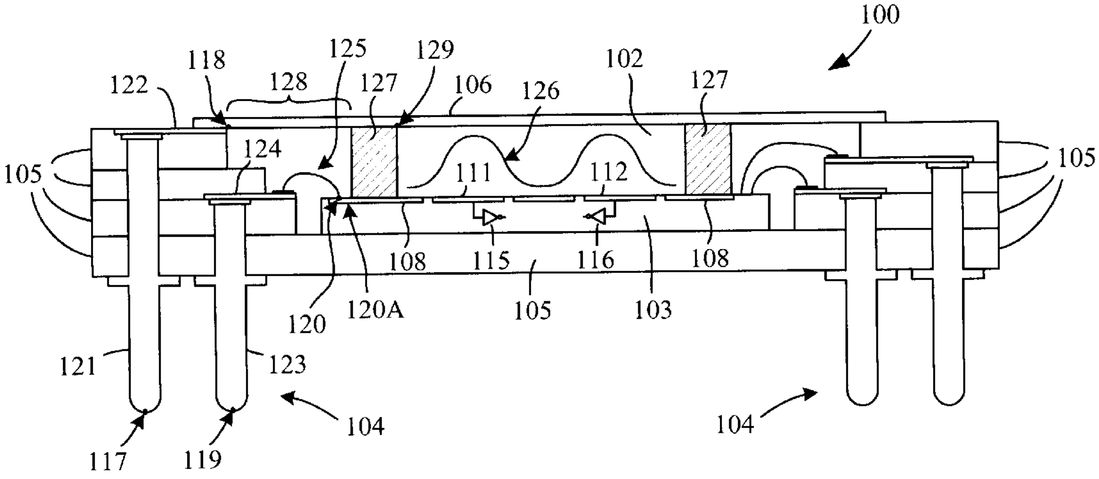
FIG. 4 is a simplified cross-sectional diagram of a packaged integrated circuit in accordance with an embodiment of the present invention.
Figure 5:
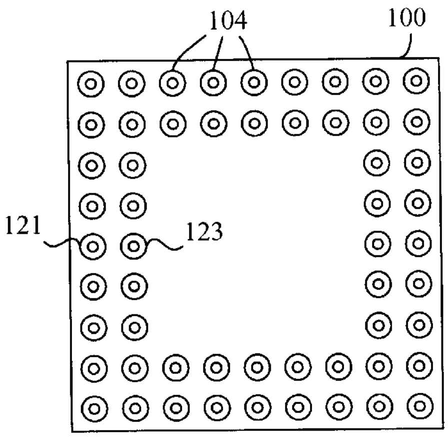
FIG. 5 is a simplified bottom-up diagram of the packaged integrated circuit of FIG. 4.
Figure 6:
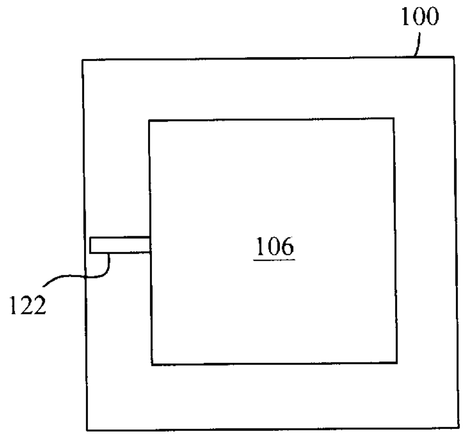
FIG. 6 is a simplified top-down diagram of the packaged integrated circuit of FIG. 4.

FIG. 4 is a simplified cross-sectional diagram of a packaged integrated circuit 100 in accordance with an embodiment of the present invention. Packaged integrated circuit 100 includes an integrated circuit package having a cavity 102 and an integrated circuit 103 disposed in the cavity. In this example, the integrated circuit package is a ceramic pin grid array integrated circuit package of sandwiched construction. The integrated circuit package includes a plurality of pins 104, a ceramic body 105, and a metal cap 106. Metal cap 106 hermetically seals the cavity. The pins 104 extend out the bottom of the package. FIG. 5 is a view of the bottom of the packaged integrated circuit 100 showing the pins 104. FIG. 6 is a view of the top of the packaged integrated circuit 100 showing the metal cap 106.

Figure 7:
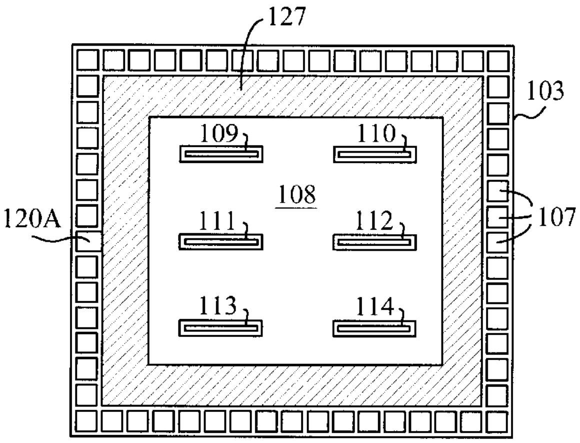
FIG. 7 is a simplified top-down diagram of an integrated circuit of the packaged integrated circuit of FIG. 4.

FIG. 7 is a simplified top-down diagram of the integrated circuit 103. Integrated circuit 103 includes a ring of bond pads 107, an inner core of logic, a layer of metal 108 that covers the core of logic (not shown in FIG. 7), a plurality of antennas 109–114, and a plurality of receiver circuits (not shown in FIG. 7). The antennas are disposed in openings in the metal layer 108. Each antenna is coupled to an input of a corresponding respective one of the receiver circuits. The core of logic and the receiver circuits are not shown in FIG. 7 because metal layer 108 and antennas 109–114 cover these circuits. The cross-sectional diagram of FIG. 4 shows a first antenna 111 coupled to an input lead of a first receiver circuit 115 and shows a second antenna 112 coupled to an input lead of a second receiver circuit 116.

Two parallel conductors can constitute a transmission line for radio frequency (RF) energy. An ideal transmission line that is properly matched and terminated can transfer RF energy from a source to a load without any loss of that RF energy and without radiating any of that RF energy into space.

In the embodiment of FIG. 4, an electrical connection from point 117 to point 118 constitutes a first conductor. An electrical connection from point 119 to point 120 on bond pad extension 120A of metal layer 108 constitutes a second conductor. The first conductor includes a vertically extending metal pin 121 and a horizontally extending metal conductor 122. Horizontally extending metal conductor 122 is seen in top-down perspective in FIG. 6. The second conductor includes a vertically extending metal pin 123, a horizontally extending metal conductor 124, and a metal bond wire 125. These first and second conductors extend substantially parallel to one another first in the vertical dimension and then in the horizontal dimension so as to form a transmission line. RF design techniques are employed to control the impedance of these first and second conductors so as to minimize impedance mismatches along these conductors and to realize a transmission line that has performance characteristics as close to those of an ideal transmission line as is realistically feasible. The characteristic impedance of the transmission line may, for example, be 50 ohms for RF energy of 40 gigahertz.

A structure called a waveguide is a structure through which electromagnetic energy can be transmitted without radiating electromagnetic energy and with very low loss. A hollow conducting tube with a rectangular cross section is one example of a waveguide. Electromagnetic waves of the proper frequency, if introduced into one end of the tube, will pass down the tube in an efficient manner reflecting off inside walls of the tube as they travel. The skin effect on the inside walls of the tube confines the electromagnetic energy inside the waveguide. No electrical current flows on the outside surface of an ideal waveguide.

In the embodiment of FIG. 4, an electromagnetic wave represented by sinewave symbol 126 propagates from left to right through air inside a waveguide-like structure. The waveguide-like structure is formed by two parallel metal surfaces. One of the parallel metal surfaces is the inside surface of cavity 102 formed by the bottom surface of metal cap 106. The other of the parallel metal surfaces is the upper surface of the metal layer 108 of integrated circuit 103. In a preferred embodiment, these two surfaces are separated by a distance that is at least one quarter of the wavelength of the electromagnetic wave in the waveguide-like structure. A 40 gigahertz electromagnetic wave has a wavelength of approximately 7.5 millimeters. Accordingly, in the example of a 40 gigahertz electromagnetic wave propagating in the waveguide-like structure, the separation between the bottom surface of metal cap 106 and the upper surface of metal layer 108 is at least approximately 1.8 millimeters.

In some embodiments, a gasket 127 of an absorptive material that absorbs RF energy is provided to help localize electromagnetic waves in the waveguide-like structure to that volume directly above metal layer 108. Electromagnetic waves that would otherwise escape in the lateral dimension from the waveguide-like structure are absorbed. In one embodiment, the gasket appears as a 377 ohm load that terminates the waveguide-like structure. Gasket 127 can, for example, be made of an absorptive material containing iron oxide particles, for example, polyiron available from SRC Cables Inc., Santa Rosa, Calif. or Eccosorb® made by Emerson & Cuming Microwave Products, Randolph, Mass. Gasket 127 can, for example, be fixed to the bottom surface of metal cap 106 by an adhesive.

In operation, pin 123 is grounded. Accordingly, metal layer 108 of integrated circuit 103 is also grounded. A two volt 40 gigahertz sinewave clock signal is driven onto pin 121 by a source external to the integrated circuit package. This clock signal is transferred via pin 121 and metal conductor 122 to point 118. Although a weak electromagnetic wave may be launched into the cavity at point 118, the clock signal passes along the bottom surface of metal plate 106, across region 128, and over gasket 127 to point 129. At this point, a corresponding 40 gigahertz electromagnetic wave is launched into the air and into the waveguide-like structure. The 40 gigahertz electromagnetic wave propagates through the air in the waveguide-like structure from left to right. When the wave reaches first antenna 111, it induces a signal in first antenna 111. First receiver circuit 115 amplifies this signal and outputs a first digital clock signal. When the wave reaches second antenna 112, it induces a signal in second antenna 112. Second receiver circuit 116 amplifies this signal and outputs a second digital clock signal. Because the electromagnetic wave propagates through air that has a dielectric constant of about one, the wave propagates from the first antenna to the second antenna at approximately $3\times10^8$ meters per second. This propagation is roughly twice as fast as the propagation down a metal conductor in a conventional integrated circuit where the interlayer dielectric is silicon dioxide having a dielectric constant of approximately four. Accordingly, for a given clock frequency, clock skew is improved in accordance with some embodiments of the present invention by increasing the propagation speed of the clock signal across the integrated circuit.

Figure 8:
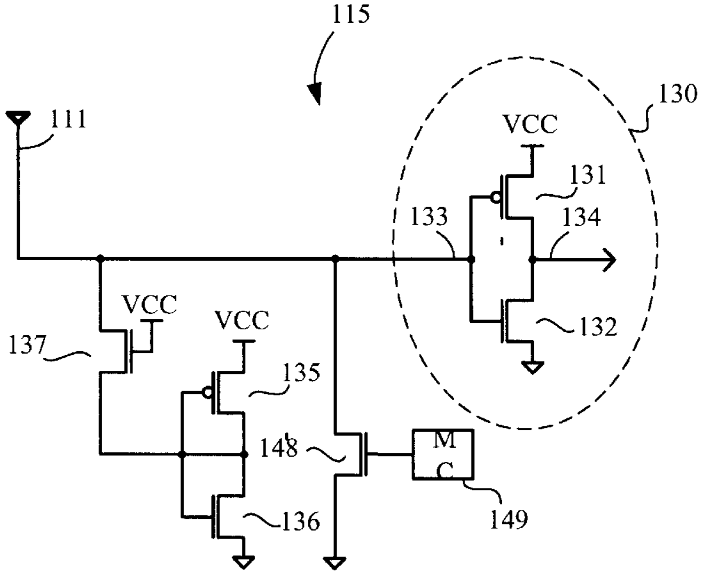
FIG. 8 is a simplified circuit diagram of an antenna and receiver circuit of the packaged integrated circuit of FIG. 4.

FIG. 8 is a simplified circuit diagram illustrative on one possible embodiment of first receiver circuit 115. The amplifier in this circuit is a complementary metal oxide semiconductor (CMOS) inverter 130 that includes a P channel transistor 131 and an N channel transistor 132. Antenna 111 is connected to an input lead 133 of inverter 130. The first digital clock signal is output from the output lead 134 of inverter 130. P channel transistor 135 and N channel transistor 136 form a voltage divider, the output of which is resistively coupled to input lead 133 through N channel transistor 137. Transistors 135–137 serve to bias the voltage on input lead 133 to approximately one half of the supply voltage VCC.

If the receiver circuit 115 is not to be used, then a memory cell 149 is programmed to output a digital logic high so that an N channel transistor 148 is conductive and couples input 133 of inverter 130 to ground. If, on the other hand, receiver circuit 115 is to be used, then memory cell 149 is programmed to output a digital logic low such that N channel transistor 148 is nonconductive and input 133 is not coupled to ground. In a static random access memory (SRAM) based FPGA embodiment, memory cell 149 is a memory cell similar to the memory cells of the programmable interconnect structure of the FPGA. Memory cell 149 is programmed in similar fashion and it is of similar construction.

Figure 9:
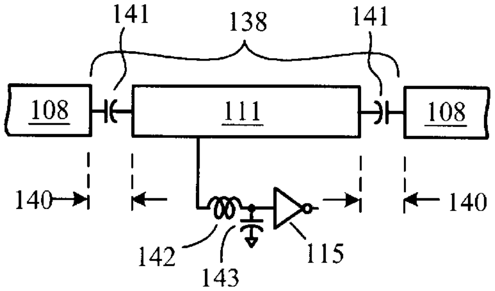
FIG. 9 is a simplified cross-sectional diagram illustrating aspects of how an antenna and associated receiver circuit of the embodiment of FIG. 4 can be tuned.

FIG. 9 is a simplified cross-sectional diagram of first antenna 111 disposed in an opening 138 in metal layer 108. In this example, a layer of Metallization is deposited when integrated circuit 103 (FIG. 7) is being fabricated and that layer is etched to form both metal layer 108 and antenna 111. Although antenna 111 and metal layer 108 are formed of the same layer of Metallization, it is to be understood that the antennas and metal layer can be formed of metal from different layers. In the embodiment of FIGS. 4 and 7, the antennas 109–144 are patch antennas, each of which is about 0.6 microns wide and at least one quarter of a wavelength long. For the 40 gigahertz embodiment of FIGS. 4 and 7, the patch antennas are each at least 1.875 millimeters long.

Because the side walls of the waveguide-like structure are formed of the absorptive gasket material in the embodiment of FIG. 4, impedance mismatches are likely to exist at the lateral edges of the waveguide-like structure. Such mismatches often give rise to standing waves that have "nodes" and "nulls". Care should be taken in the placement of the antennas to make sure they are not disposed at nulls where there is no RF voltage at the surface of the integrated circuit. In the embodiment of FIG. 7, the center of antenna 111 is separated from the center of antenna 112 by a distance of one wavelength so that both antennas will be centered on nodes for maximum signal strength (the wavelength of a 40 gigahertz signal is about 7.5 millimeters).

The antenna and receiver circuit is also preferably tuned to the frequency of the electromagnetic wave to be received. The separation 140 between antenna 111 and the sidewalls of the opening 138 in metal layer 108 have an associated capacitance represented in FIG. 9 by capacitor symbols 141. Moreover, the conductor that connects the antenna 111 to the input lead of receiver circuit 115 has an associated inductance represented in FIG. 9 by an inductor symbol 142. The gates of the transistors of CMOS inverter 130 also have an associated capacitance 143. These inductances and capacitances as well as any other inductances and capacitances on antenna 111 are taken into account in tuning the antenna and receiver circuit. Increasing the length of antenna 111 generally increases its inductance whereas decreasing the length of antenna 111 generally decreases its inductance. As seen from FIG. 9, capacitances 141 serve to short the high frequency signals on antenna 111 to the ground metal layer 108. These capacitances 141 are therefore preferably small. In the embodiment of FIGS. 4 and 7, spacing 140 is approximately two microns.

Figure 10:
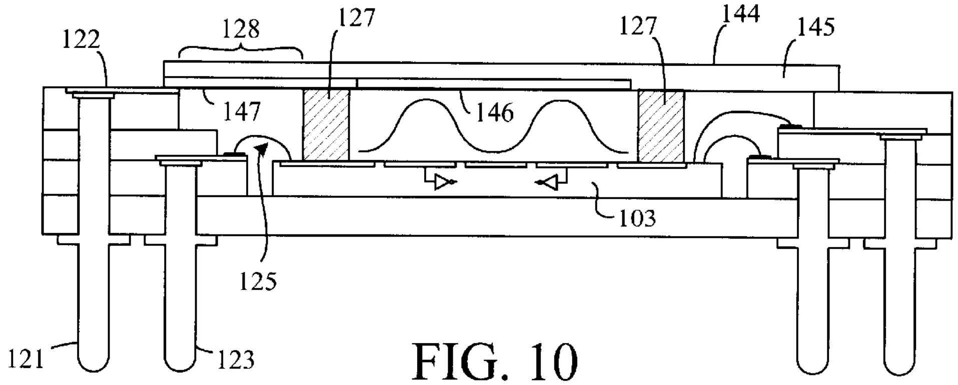
FIG. 10 is a simplified cross-sectional diagram of a packaged integrated circuit in accordance with another embodiment of the present invention.
Figure 11:
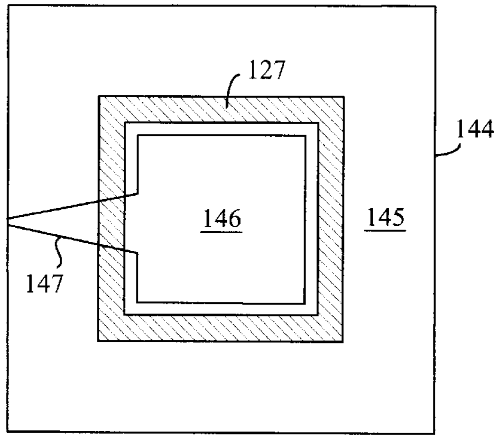
FIG. 11 is a top-down view of the bottom surface of the cap of the packaged integrated circuit of FIG. 10.

FIGS. 10 and 11 are diagrams of an embodiment where the integrated circuit package has a different cap 144. FIG.

11 is a view of the bottom of cap 144 with RF absorbing gasket 127 sitting on top of it. Cap 144 includes a ceramic body 145, a central metal plate portion 146 disposed on the bottom of cap 144, and a metal trace portion 147 that extends from the edge of the cap 144 to the central metal plate portion 146. The bottom surface of central metal plate portion 146 is one of the two parallel metal surfaces that defines the waveguide-like structure. The upper metal plate of the waveguide-like structure is limited in its lateral extent as illustrated in FIG. 11 so that the waveguide-like structure will be confined to an area bounded by gasket 127. This and other means may be employed to prevent electromagnetic waves from propagating in region 128 and inducing unwanted noise into bond wires.

Where the two-wire transmission line extending from pins 121 and 123 has a first characteristic impedance (for example, 50 ohms) that is terminated by a different second characteristic impedance (for example, by a lower impedance of gasket 127), matching techniques known in the art can be employed to reduce the abruptness of the impedance mismatch. In the embodiment of FIGS. 10 and 11, trace 147 gradually widens as it extends inward from conductor 122 to the central metal plate portion 146.

Figure 12:
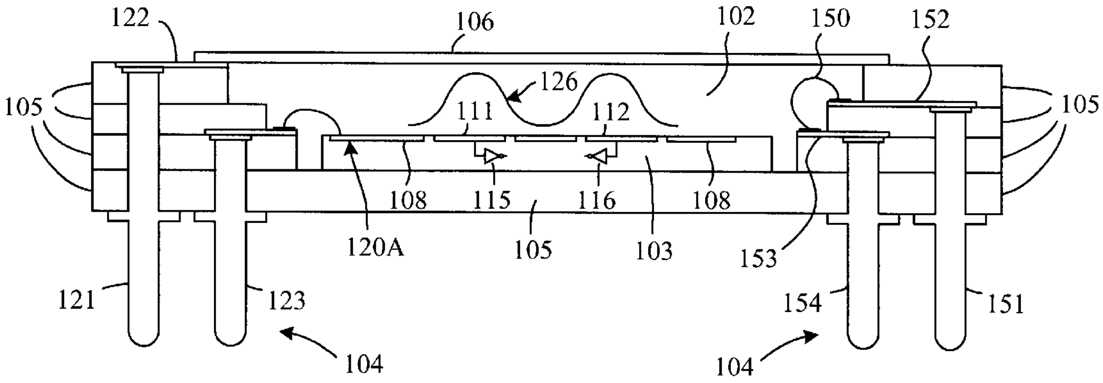
FIG. 12 is a simplified cross-sectional diagram of an embodiment wherein an electromagnetic wave is launched into air from a conductive loop disposed inside a cavity of an integrated circuit package.

FIG. 12 is a simplified cross-sectional diagram of an embodiment wherein an electromagnetic wave is launched into air inside cavity 102 from a conductive loop 150. The electromagnetic wave propagates from right to left reflecting off the bottom surface of metal cap 106 and off metal layer 108 of integrated circuit 103. An RF input signal in the form of an oscillating current flows into the integrated circuit package via terminal 151, through horizontally extending conductor 152, through loop 150, through horizontally extending conductor 153, and back out of the integrated circuit package via terminal 154. Although loop 150 in the specific embodiment of FIG. 12 is a loop of bond wire, other radiating structures can be realized on the bond terraces inside the integrated circuit package. For example, a radiating antenna in the form of a trace of metal can be realized on a bond terrace.

Figure 13:
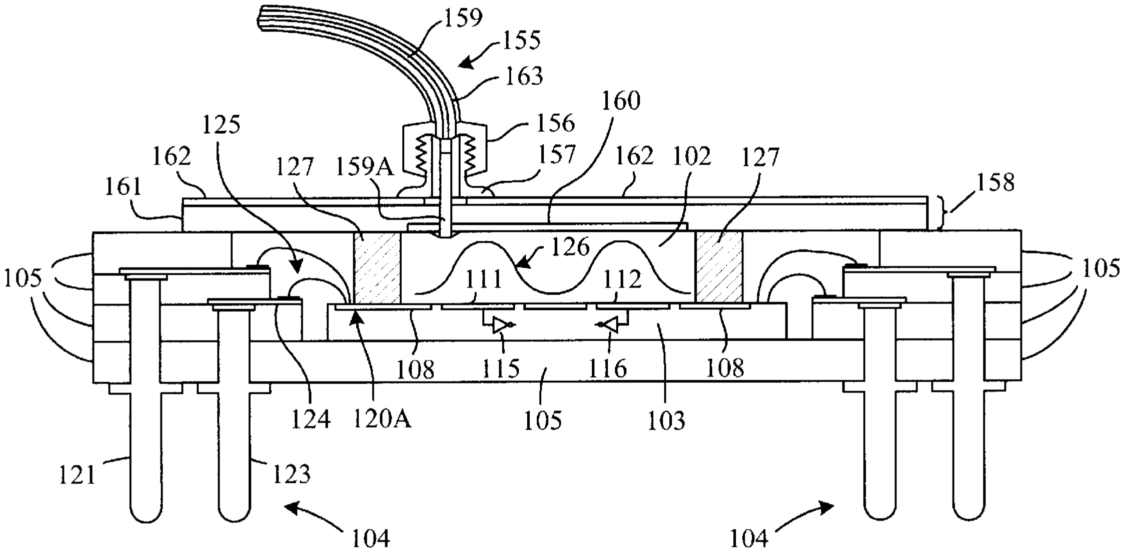
FIG. 13 is a simplified cross-sectional diagram of an embodiment wherein RF energy from a coaxial cable is introduced into a cavity of an integrated circuit package so that an electromagnetic wave propagates in air inside the cavity and across an integrated circuit.

FIG. 13 is a simplified cross-sectional diagram of an embodiment wherein RF energy is introduced into cavity 102 of the integrated circuit package via a coaxial cable 155. Coaxial cable 155 is a semi-rigid one quarter inch diameter coaxial cable fitted with a threaded female SMA connector 156. A threaded male SMA connector 157 is fixed to the cap 158 of the integrated circuit package so that the center conductor 159 of the coaxial cable is coupled to a radiating conductor 160 on the bottom surface of cap 158. In this embodiment, the center conductor 159 of coaxial cable 155 is coupled to radiating conductor 160 via a center conductor 159A of male SMA connector 157.

Figure 14:
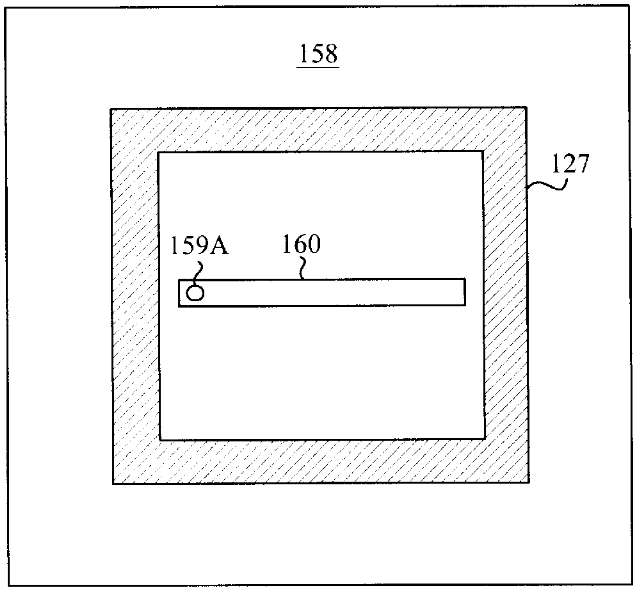
FIG. 14 is a diagram of the bottom of a cap of the integrated circuit package of FIG. 13.

FIG. 14 is a view of the bottom surface of cap 158. Radiating conductor 160 is a strip of gold plated copper. This strip is disposed within the lateral confines of gasket 127 so that the electromagnetic wave in the cavity is confined in the lateral dimension by the gasket 127. The RF energy from coaxial cable 155 is introduced into the left side of the cavity and an electromagnetic wave propagates inside the cavity from left to right through air across the upper surface of integrated circuit 103. Although illustrated here as a strip, radiating conductor 160 can have other forms. Radiating conductor 160 may, for example, be a rectangular sheet of metal on the bottom of cap 158 that extends across substantially all the area defined by the inside margins of gasket 127.

In the embodiment of FIGS. 13 and 14, cap 158 is a metalized ceramic cap having a sandwiched construction. Cap 158 has a ceramic body 161 that separates radiating conductor 160 from a metal layer 162. The outer conductor 163 of the coaxial cable 155 is coupled to metal layer 162 via the female and male SMA connectors 156 and 157. Male SMA connector 157 may be fixed to cap 158 by being mechanically pressure fit into a receiving opening in cap 158 and/or by being soldered to radiating conductor 160 and to metal layer 162. In the embodiment of FIGS. 13 and 14, metal layer 108 on the upper surface of integrated circuit 103 is coupled to the metal layer 162 of cap 158 via bond wire 125, horizontally extending conductor 124, vertically extending terminal 123, and an external connection (not shown) from terminal 123 to the outer conductor 163 of coaxial cable 155. It is to be understood, however, that this connection from metal layer 108 to metal layer 162 may be established through the integrated circuit package in other embodiments. Conductor 124 may, for example, be connected to layer 162 through vias (not shown) in the body of the integrated circuit package and through a via (not shown) in ceramic cap 158. Although body 161 of the cap in the illustrated embodiment is a wafer-like piece of ceramic, body 161 may be made of other suitable materials including an epoxy-fiberglass type material such as is used to make printed circuit boards.

Figure 15:
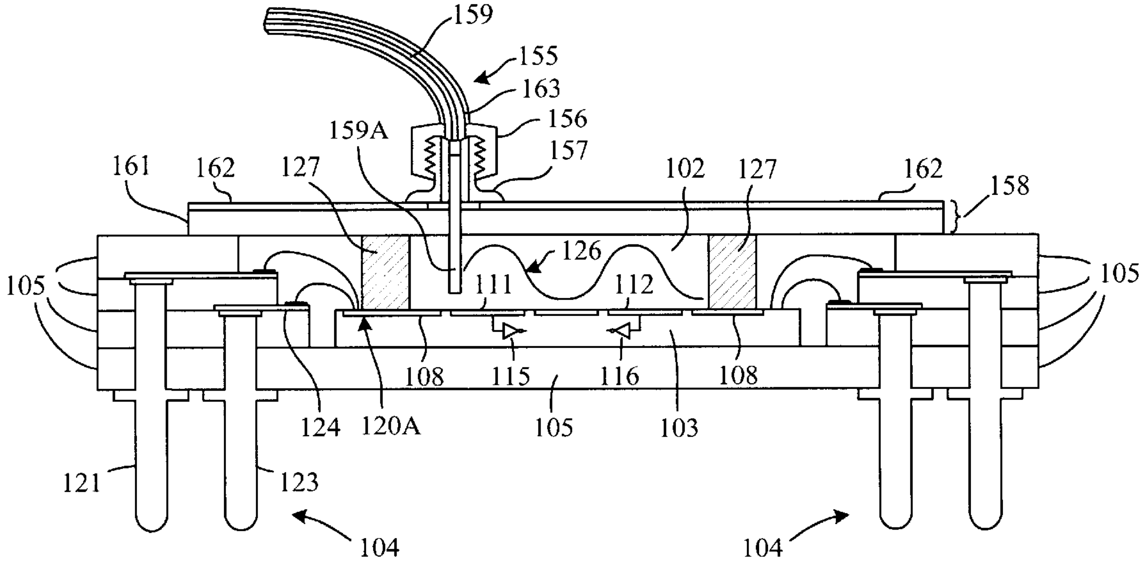
FIG. 15 is a simplified cross-sectional diagram of an embodiment wherein an electromagnetic wave radiates from a center conductor of an SMA connector and propagates through air in the cavity across an integrated circuit.

FIG. 15 is a simplified cross-sectional diagram of an embodiment wherein RF energy is introduced into cavity 102 via coaxial cable 155 but rather than an electromagnetic wave radiating from a horizontally extending radiating conductor 160 on the bottom of the package cap, the center conductor 159A of the male SMA connector 157 is made to extend into cavity 102 such that the electromagnetic wave radiates from this center conductor 159A. Center conductor 159A preferably extends into cavity 102 by a distance of at least one quarter wavelength.

By propagating a clock signal in air across the upper surface of an integrated circuit and then receiving it locally using antennas, it is recognized that an FPGA can be realized that does not have a global clock distribution network. In accordance with one embodiment, a programmed FPGA has no global clock distribution network. Sequential logic elements (for example, flip-flops) in the core of the FPGA are clocked by a single clock signal that is received locally via local antennas. The term clock distribution network here includes hardwired clock distribution networks as well as clock distribution networks that are programmed into FPGAs.

Although the present invention is described in connection with certain specific embodiments for instructional purposes, the present invention is not limited thereto. An electromagnetic wave may be propagated in accordance with the invention in a cavity of a package other than a ceramic pin grid array package. Numerous different types of receiver circuits can be employed including circuits having frequency dividers if a clock signal of lower frequency is desired. The electromagnetic wave can be transmitted from an antenna disposed on the integrated circuit itself. Numerous different types and forms of receiving antennas can be employed. The electromagnetic wave need not only pass through air inside the cavity, but rather may also pass through other materials including incidental passivation layers on the top of the integrated circuit. The electromagnetic wave can be transmitted from outside the package and made to pass through a wall of the package so that it then propagates through air inside the cavity as desired. Accordingly, various modifications, adaptations, and combinations of various features of the described embodiments can be practiced without departing from the scope of the invention as set forth in the claims.

What is claimed is:

1. A programmed field programmable gate array having a plurality of clocking sequential logic elements, the plurality of clocking sequential logic elements being disposed in a core of the programmed field programmable gate array, each of the clocking sequential logic elements being clocked by the same clock signal of wavelength A, none of the clocking sequential logic elements receiving a clock signal from a clock distribution network that distributes a clock signal of wavelength A.

2. The programmed field programmable gate array of claim 1, wherein the clock distribution network is part of the programmed field programmable gate array.

3. The programmed field programmable gate array of claim 2, wherein the programmed field programmable gate array further comprises a second plurality of sequential logic elements, each of the second plurality of clocking sequential logic elements receiving a second clock signal from the clock distribution network.

4. The programmed field programmable gate array of claim 1, wherein the programmed field programmable gate array includes no clock distribution network.

5. The programmed field programmable gate array of claim 1, wherein the programmed field programmable gate array includes no hardwired clock distribution network.

6. The programmed field programmable gate array of claim 1, wherein the programmed field programmable gate array includes no clock distribution network that is programmed into the programmed field programmable gate array.

7. The programmed field programmable gate array of claim 1, further comprising:

a plurality of receiving antennas disposed substantially in a plane;

a plurality of receiver circuits, each of the receiving antennas being coupled to an input of a corresponding respective one of the receiver circuits, each of the receiver circuits supplying the clock signal of wavelength A to a corresponding respective one of the plurality of clocking sequential logic elements; and a radiating conductor, an electromagnetic wave of wavelength A radiating from the radiating conductor and propagating from the radiating conductor to each of the receiving antennas.

8. The programmed field programmable gate array of claim 1, wherein the programmed field programmable gate array includes:

an integrated circuit package having a cavity, the cavity having a conductive planar inside surface; and a field programmable gate array integrated circuit disposed in the cavity, the integrated circuit having a substantially planar surface that extends parallel to the conductive planar inside surface of the cavity, wherein the clock signal of wavelength A propagates as an electromagnetic wave between the conductive planar surface of the integrated circuit and the conductive planar inside surface of the cavity, the electromagnetic wave being received on a plurality of receiving antennas of the field programmable gate array integrated circuit such that the clock signal of wavelength A is induced onto each of the receiving antennas, each respective one of the receiving antennas being coupled to a corresponding respective one of the clocking sequential logic elements.

9. The programmed field programmable gate array of claim 1, wherein the programmed field programmable gate array comprises an integrated circuit package and a field programmable gate array integrated circuit, the integrated circuit being disposed in a cavity of the integrated circuit package, the integrated circuit being coupled to the integrated circuit package by bond wires, the programmed field programmable gate array further comprising a gasket that absorbs electromagnetic waves, the gasket preventing the electromagnetic waves from being induced into the bond wires.

10. The programmed field programmable gate array of claim 1, wherein the programmed field programmable gate array comprises a field programmable gate array integrated circuit, the integrated circuit comprising a metal layer, the metal layer having a plurality of openings, each opening containing a corresponding respective one of a plurality of antennas, each respective one of the antennas supplying the clock signal of wavelength A to a corresponding respective one of the clocking sequential logic elements.

11. The programmed field programmable gate array of claim 1, further comprising a plurality of receiver circuits, each receiver circuit having an output lead that is coupled to a corresponding respective one of the clocking sequential logic elements, each of the receiver circuits comprising a memory cell, a receiver circuit being disabled if the memory cell of the receiver unit stores a predetermined digital value.

12. The programmed field programmable gate array of claim 1, further comprising a plurality of receiver circuits, each receiver circuit having an output lead that is coupled to a corresponding respective one of the clocking sequential logic elements, each of the receiver circuits comprising means for programmably disabling the receiver circuit.

13. A programmable integrated circuit device comprising:

a first antenna coupled to a first sequential logic element;

a second antenna coupled to a second sequential logic element, the first antenna not being coupled to the second antenna; and means for propagating an electromagnetic wave of wavelength A in air to the first and second antennas such that both the first and second sequential logic elements are clocked by the same clock signal of wavelength A, neither of the first and second sequential logic elements receiving a clock signal of wavelength A from a clock distribution network of the programmable integrated circuit device.

14. The programmable integrated circuit device of claim 13, wherein the programmable integrated circuit device includes an integrated circuit and an integrated circuit package, wherein the means for propagating comprises means for launching the electromagnetic wave from a launch location inside the integrated circuit package.

15. The programmable integrated circuit device of claim 14, wherein the launch location is an antenna disposed on the integrated circuit.

16. The programmable integrated circuit device of claim 13, wherein the programmable integrated circuit device includes no clock distribution network capable of supplying a clock signal to the first and second sequential logic elements.

17. The programmable integrated circuit device of claim 13, wherein the first antenna is coupled to the first sequential logic element via a first RF receiver circuit, and wherein the second antenna is coupled to the second sequential logic element via a second RF receiver circuit, the programmable integrated circuit device further comprising means for programmably disabling the first RF receiver circuit, and means for programmably disabling the second RF receiver circuit.

18. The programmable integrated circuit device of claim 13, wherein the programmable integrated circuit device includes an integrated circuit and an integrated circuit package, wherein the means for propagating comprises a waveguide structure, the waveguide structure being formed by a metal surface of the integrated circuit package and a metal layer of the integrated circuit.

19. The programmable integrated circuit device of claim 13, wherein the first and second antennas are patch antennas.

20. A method, comprising:

launching an electromagnetic wave of wavelength A inside an integrated circuit package, the integrated circuit package containing a field programmable gate array integrated circuit, the field programmable gate array integrated circuit having a substantially planar surface, the electromagnetic wave propagating through air inside the integrated circuit package in a direction substantially parallel to the substantially planar surface;

receiving the electromagnetic wave of wavelength A on a first antenna of the field programmable gate array integrated circuit such that a first sequential logic element is clocked with a clock signal of wavelength A; and receiving the electromagnetic wave of wavelength A on a second antenna of the field programmable gate array integrated circuit such that a second sequential logic element is clocked with a clock signal of wavelength A, the field programmable gate array integrated circuit including no clock distribution network that supplies a clock signal to either the first sequential logic element or to the second sequential logic element.

21. The field programmable gate array integrated circuit device of claim 20, wherein the antenna is integrated on the field programmable gate array integrated circuit.

22. A field programmable gate array integrated circuit device comprising:

an integrated circuit package; and a field programmable gate array integrated circuit contained in the integrated circuit package, the field programmable gate array integrated circuit comprising:

a plurality of user-programmable memory cells for programmably configuring the field programmable gate array integrated circuit; and an RF receiver circuit having an input lead coupled to an antenna, an electromagnetic wave of wavelength A propagating from a source outside the field programmable gate array integrated circuit device through the integrated circuit package and into the field programmable gate array integrated circuit device, the electromagnetic wave inducing a signal on the antenna such that the RF receiver circuit amplifies the signal and outputs a corresponding digital signal, the RF receiver circuit being tuned to wavelength A, the RF receiver circuit comprising one of the user-programmable memory cells, the RF receiver circuit being disabled when said one of the user-programmable memory cells contains a predetermined logic value.

23. The field programmable gate array integrated circuit of claim 22, wherein the antenna is a strip of metal at least 1.8 millimeters long, the strip having an end, there being no transistor coupled to the strip within 0.45 millimeters from the end.

* * * * *